United States Patent
Baarman et al.

(10) Patent No.: US 8,223,508 B2
(45) Date of Patent: Jul. 17, 2012

(54) POWER SUPPLY

(75) Inventors: David W. Baarman, Fennville, MI (US); Joshua K. Schwannecke, Grand Rapids, MI (US); Joshua B. Taylor, Rockford, MI (US); John James Lord, Springfield, IL (US); Wesley J. Bachman, Auburn, IL (US)

(73) Assignee: Access Business Group International LLC, Ada, MI (US)

( * ) Notice: Subject to any disclaimer, the term of this patent is extended or adjusted under 35 U.S.C. 154(b) by 892 days.

(21) Appl. No.: 12/051,939

(22) Filed: Mar. 20, 2008

(65) Prior Publication Data

US 2008/0231211 A1 Sep. 25, 2008

Related U.S. Application Data

(60) Provisional application No. 60/895,968, filed on Mar. 20, 2007.

(51) Int. Cl.
*H02M 3/335* (2006.01)
*H02M 5/42* (2006.01)
(52) U.S. Cl. ............ 363/17; 363/21.01; 363/88
(58) Field of Classification Search .......... 363/17, 363/20–21.18, 88
See application file for complete search history.

(56) References Cited

U.S. PATENT DOCUMENTS

| | | | |
|---|---|---|---|
| 3,016,484 A * | 1/1962 | Rasmusen et al. | ............ 363/100 |
| 4,076,996 A | 2/1978 | Maehara et al. | |
| 4,262,245 A | 4/1981 | Wendt | |
| 5,341,085 A | 8/1994 | Ettes | |
| 5,367,242 A | 11/1994 | Hulman | |
| 5,455,466 A | 10/1995 | Parks et al. | |
| 5,499,176 A | 3/1996 | Erisman | |
| 5,596,567 A | 1/1997 | deMuro et al. | |
| 5,625,539 A | 4/1997 | Nakata | |
| 5,734,254 A | 3/1998 | Stephens | |

(Continued)

FOREIGN PATENT DOCUMENTS

WO    WO00/54387    2/2001

OTHER PUBLICATIONS

International Search Report and Written Opinion of the International Searching Authority for PCT/US2008/057608.

(Continued)

*Primary Examiner* — Jessica Han
(74) *Attorney, Agent, or Firm* — Warner, Norcross & Judd LLP

(57) ABSTRACT

A power supply to provide electrical power to one or more loads. The power supply may include a resonant air core transformer to provide an adjustable and adaptable source of power to electronic devices. The power supply may include isolated primary-side circuitry and secondary-side circuitry. The primary-side circuitry may include control circuitry that, among other things, provides drive waveforms for the primary-side switching circuitry. In embodiments configured to produce AC output, the secondary-side circuitry may also include switching circuitry. The primary-side control circuitry may provide drive waveforms for the secondary-side switching circuitry. The secondary-side circuitry may include measurement circuitry that measures the current and/or voltage of the output and provides those measurements to the control circuitry through isolation circuitry. The control circuitry may adjust the drive waveforms for the primary-side and/or secondary-side switching circuitry as a function of the measured values.

16 Claims, 9 Drawing Sheets

U.S. PATENT DOCUMENTS

| | | |
|---|---|---|
| 5,796,334 A | 8/1998 | Chen et al. |
| 5,963,012 A | 10/1999 | Garcia et al. |
| 6,118,249 A | 9/2000 | Brockmann et al. |
| 6,184,651 B1 | 2/2001 | Fernandez |
| 6,307,758 B1 | 10/2001 | Geren |
| 6,441,654 B1 | 8/2002 | Yamamoto |
| 6,831,846 B2 * | 12/2004 | Yasumura .................. 363/21.02 |
| 6,934,167 B2 | 8/2005 | Jang et al. |
| 7,095,629 B2 | 8/2006 | Yasumura |
| 7,158,389 B2 | 1/2007 | Yasumura |
| 7,180,248 B2 | 2/2007 | Kuennen |
| 7,268,659 B2 | 9/2007 | Nishio et al. |
| 7,773,399 B2 * | 8/2010 | Nakamura et al. ............ 363/127 |
| 2001/0022548 A1 | 9/2001 | Hasler |
| 2002/0154518 A1 | 10/2002 | Elferich et al. |
| 2003/0214821 A1 | 11/2003 | Giannopoulos et al. |
| 2007/0042729 A1 | 2/2007 | Baaman |

OTHER PUBLICATIONS

Antoniazzi, P., "Power Supply Design Basics," published 1995 by SGS-Thomson Microelectronics, pp. 1-6.

* cited by examiner

POWER SUPPLY

BACKGROUND OF THE INVENTION

The present invention relates to power supplies and more particularly to a power supply having a transformer for converting mains power into AC or DC power.

A typical power supply includes a transformer. A transformer is an electrical device that transfers electrical energy from a primary coil through a time varying magnetic field to a secondary coil upon the addition of an electrical load to the secondary coil. Transformers are used in a variety of applications, such as mains power delivery for electronics and children's toys, and come in a variety of sizes, from very large to miniature.

A conventional transformer consists of a core, which may be made of iron or some other ferrous material, in the shape of a loop. On one side of the core, wire is coiled around the core, and primary or mains voltage is applied. This side of the core is called the primary. Opposite the primary is a similar arrangement called the secondary. By varying the number of turns of wire in the coil more explicitly the turns ratio of the primary to secondary, the voltage may be stepped up or down depending upon the required usage, and the load applied to the secondary.

One disadvantage of transformers using an iron core is that to achieve the necessary performance, the core had to be of a substantial size and requisite weight. This results in transformers that are bulky and difficult to package. In many cases these bulky transformers consume precious space, such as those transformers built directly into the mains plug, such that the transformer blocks other outlets, as can be the case in power strips or wall outlets. Due to the weight of traditional transformers, additional effort must be expended to insure that that transformer casing is suitably strong, to withstand a drop which may occur during normal use. If the transformer is to be wall mounted, certain applications may not be suitable due to the excess weight placed upon wall mounts.

Also, the cost of the iron in traditional transformers is also an undesirable factor. In addition to the direct material cost of iron or other ferrous metals, the traditional transformer must be made larger to accommodate the large coil, necessitating the use of additional other materials, such as plastic, increasing cost. Copper wire or other conductive material is used abundantly in forming the primary and secondary coils, further adding to the cost of traditional transformers.

Further, the iron core inherently retains a sizeable buffer of energy, which is capable of being discharged through a short circuit. Because energy is stored in the iron core, in the event of a short circuit, it can take considerable time for the energy to dissipate from the system, which could cause damage. Further, the transformer may continue to provide power either until the mains power breaker trips or the transformer itself fails, or the short circuit is removed.

Traditional transformer power supplies are not dimmable, as a result of their fixed turns of wire that only step up or step down an input voltage for a set output voltage. As a result, if dimming is required, a power supply with a transformer is not a desirable selection as a power supply. For example, in the case of lighting, there are many applications where full light intensity is not desired at all times, as in the case of security lighting. A security light could be set to run at less than full power for normal operation, then switch to full power if a motion sensor connected to the system detects motion, for example. This operation would conserve energy yet also provide illumination for appearance and security. Unfortunately, a power supply with a traditional transformer is not usable in this application.

Voltage drop over a distance has plagued power supplies with traditional transformers. Using the example of landscape lighting, a transformer is located near a mains power source, and a power supply line is connected to it. The line runs from the power supply until it terminates some distance away, for example, 50 feet. Lights are provided that clip into the supply line using connectors that pierce the wire to make an electrical connection. In this way the position of the lights can be varied according to the particular landscape application. The power supply line, like any wire, has some resistance. So the voltage measured at the end of the supply line will be lower than at a point located near to the transformer. With a power supply having a traditional transformer, the instructions recommend placing the lights at somewhat equal distances along the supply line in order to compensate for the resistive effect of the wire. However, the particular landscape application may call for most or all of the lights to be installed toward the end of the supply line. A power supply with a traditional transformer may have difficulty adequately powering the lights, and the lights at the very end may be dim or fail to light at all. This situation is undesirable and places unnecessary limits on landscape lighting, or other applications.

Yet another disadvantage of an iron core transformer is the inability to compensate for fluctuations in mains voltage. If there is a power spike or sag, the iron core transformer is not equipped to protect the devices it is powering, which could result in permanent damage. No logic or circuitry is present in a power supply with a traditional transformer, to detect power fluctuations. Since many modern electronic devices are sensitive to such power fluctuations, use of a traditional transformer with these devices could result in damage or destruction of these devices.

SUMMARY OF THE INVENTION

The present invention provides a power supply having a resonant air core transformer, which overcomes a number of disadvantages of traditional iron core transformers while providing additional previously unavailable features. In one embodiment, the transformer includes paired primary and secondary coils that are coreless and separated by an air gap without any iron core.

In one embodiment, the power supply includes isolated primary-side and secondary-side circuitry. The wireless transfer of power is provided through the inductive coupling between the primary coil and the secondary coil and wireless transfer of control signals is provided through isolation circuitry. In one embodiment, the isolation circuitry includes one or more optocouplers or optoisolators.

In one embodiment, the secondary-side circuitry produces an AC output. In this embodiment, the secondary-side circuitry may include circuitry to rectify the transformer output and a switching circuitry to generate an AC output at the desired frequency and voltage. The secondary-side circuitry may include circuitry to measure the output voltage of the secondary-side switching circuitry and to adjust the duty-cycle of the secondary-side switching circuitry to control the average voltage.

In one embodiment, the primary-side control circuitry may adjust the duty cycle of the secondary-side switching circuitry through the isolation circuitry. In this embodiment, the secondary-side circuitry may include measurement circuitry that measures the voltage and/or current of the secondary-side switching circuitry output and sends a corresponding signal to the control circuitry in the primary-side circuitry. This signal may be sent through the isolation circuitry. The primary-side control circuitry may control the duty cycle of the secondary-side switching circuitry as a function of the measured voltage and/or current. The control circuitry may also monitor the measured current received from the measurement circuitry to look for the presence of over-current situations. The control circuitry may reset, disable or otherwise respond to the presence of an over-current situation.

In one embodiment, the secondary-side circuitry produces a DC output. In this embodiment, the secondary-side circuitry may include a rectifier for rectifying the AC output of the secondary coil. The output of the rectifier may be passed through filtering circuitry and/or a voltage regulator.

In DC-output embodiments, the secondary-side circuitry may include measurement circuitry that measures the voltage and/or current of the secondary-side output and sends a corresponding signal to the control circuitry in the primary-side circuitry through the isolation circuitry. The primary-side control circuitry may control the primary-side switching circuitry (e.g. frequency or duty cycle) as a function of the measured voltage and/or current. The control circuitry may also monitor the measured current received from the measurement circuitry to look for over-current situations. The control circuitry may reset, disable or otherwise respond to the presence of an over-current situation.

In both AC- and DC-output embodiments, the control circuitry may be programmed to maintain the secondary-side output at a specific voltage set point. In one embodiment, the present invention may include a power supply tuning system that has one or more remote voltage monitors that permit the voltage set point to be adjusted to compensate for variations in the resistance of the power supply lines running from the secondary-side output to the load(s). These adjustments may be made during installation or at other times. The remote voltage monitors may be wireless and provide wireless signals to a base that collects the signals and provides them to control software on a computer. The software may provide information indicative of the power-loss resulting from the power supply lines to permit the voltage set point to be adjusted to compensate for the loss. For example, in landscape lighting application where a plurality of lamps are installed along a power supply line, one or more remote voltage monitors may be used to measure voltage at each lamp. In situations where a significant power loss is found, the voltage set point of the power supply can be increased as a function of the measured power loss to provide a voltage that yields the desired balance between the plurality of lamps.

The air core transformer does not store energy in the same manner as a cored-transformer, so in the event of a short circuit, the primary side of the inductive coil may react much faster than an iron core transformer and the energy remaining in the secondary side of the inductive coil of the air core transformer is quickly dissipated. This fault detection ability and quick recovery is not present in traditional iron core transformers. As a result, if a short circuit occurs, the traditional transformer may continue to provide power until a line circuit breaker trips, or the cause of the short circuit is removed. This situation is undesirable and is potentially hazardous as well. In many applications, traditional transformers are used in applications where the likelihood of a short circuit is greater. For example, in outdoor lighting applications, wired lamps are powered by a transformer. The power supply wire is buried within landscaping, but is exposed to water and the elements. Due to the lamps' location in landscaping areas, the power supply wire is more likely to be in jeopardy from sharp tools are used to tend to the neighboring flora. It is conceivable that a sharp tool could cut or damage the power supply wire, resulting in a short circuit situation. Due to the rapid response of the air-core transformer as disclosed herein, if such an event were to occur, the voltage in the line would be halted relatively quickly.

Another feature of the resonant air core transformer is the ability of the power supply to compensate for lead-in wire voltage drop. Using the circuitry integrated into the air core transformer, the voltage drop is compensated for, allowing placement of loads and distance from the power supply. The circuitry determines the best frequency by sensing the load(s) placed on it, including factoring in the resistance of the power supply line. Thus, the power supply can provide the same power to loads clustered near the transformer as to those clustered far away from the transformer on the power supply line.

Another advantage of the resonant air core transformer is its ability to quickly adjust and compensate for fluctuations in mains voltage. In the event of a power spike or sag, the power supply easily detects and regulates the secondary side voltage to prevent under- or over-voltage conditions. The logic or circuitry of the power supply senses changes in the mains voltage and adjusts appropriately in an effort to preserve any attached devices drawing a load. Thus, the resonant air core transformer helps to protect devices from damage due to mains power abnormalities.

Another feature of the power supply is its ability to be soft-started using control circuitry to reduce startup stress on electronic devices. Soft-starting is the ability to ramp up or slowly increase power supplied to a device(s) so as to avoid damaging it. Many sensitive modern devices require or benefit from a soft-start and can be damaged if a soft-start is not used. Additionally, soft-starting may extend the life of many devices by placing less stress on energized components.

Another feature of the power supply is its dimming capabilities. Because of the control circuitry, the output voltage is regulatable even though the wire turns ratio is fixed. As a result, in a lighting application for example, the lights connected to the air core transformer are dimmable from full intensity to completely unlit.

The air core transformer may also operate at a higher ambient temperature than traditional transformers. Traditional iron core transformers cannot operate at temperatures dramatically above ambient room temperature. Because of the self-heating efficiency of the air core transformer, its lack of a large conductive iron core, the operating temperatures are dramatically reduced when compared to a traditional transformer, to near ambient temperature in some embodiments. This temperature reduction is beneficial because the extra heat of the traditional transformer is wasted energy, and can have a detrimental effect on electronic devices or other items located nearby when exposed to the high operating temperatures of a traditional transformer. Further, the iron core transformer must be designed to accommodate the accompanying heat of its operation, which increases cost.

The power supply may also include over-current protection circuitry, which helps to protect both itself and any devices drawing power. In the event of an over-current situation, such as adding too many landscape lamps to the power supply line, when pulse width modulation duty cycle reaches a predetermined level, the transformer may shut down momentarily after which a soft start commences. The lamps, in this example, will blink at a reduced power output until the over current condition is resolved. In other cases, other signaling means could be employed, such as an audible tone or other indicators as the application requires.

For a better understanding of the present invention, together with other and further features and advantages thereof, reference is made to the following description, taken in conjunction with the accompanying drawings, and the scope of the disclosure will be laid out in the claims.

It will be readily understood that the components of the present disclosure, as generally described and illustrated in the figures herein, may be arranged and designed in a wide variety of different configurations. Thus, the following more detailed description of the embodiments of the apparatus, system, and method of the present disclosure, as represented in the accompanying figures, is not intended to limit the scope of the disclosure, as claimed, but is merely representative of selected embodiments of the disclosure.

Reference throughout this specification to "one embodiment" or "an embodiment" (or similar) means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples, to provide a thorough understanding of embodiments of the present disclosure. One skilled in the art will recognize, however, that the disclosure can be practiced without one or more of the specific details, or with other methods, components, materials, etc. In other instances, well-known structures, materials, or operations are not shown or described in detail to avoid obscuring aspects of the disclosure.

The illustrated embodiments of the disclosure will be best understood by reference to the drawings, wherein like parts are designated by like numerals or other labels throughout. The following description is intended only by way of example, and simply illustrates certain selected embodiments of devices, systems, and processes that are consistent with the disclosure as claimed herein.

DETAILED DESCRIPTION OF CURRENT EMBODIMENTS

Figure 1:
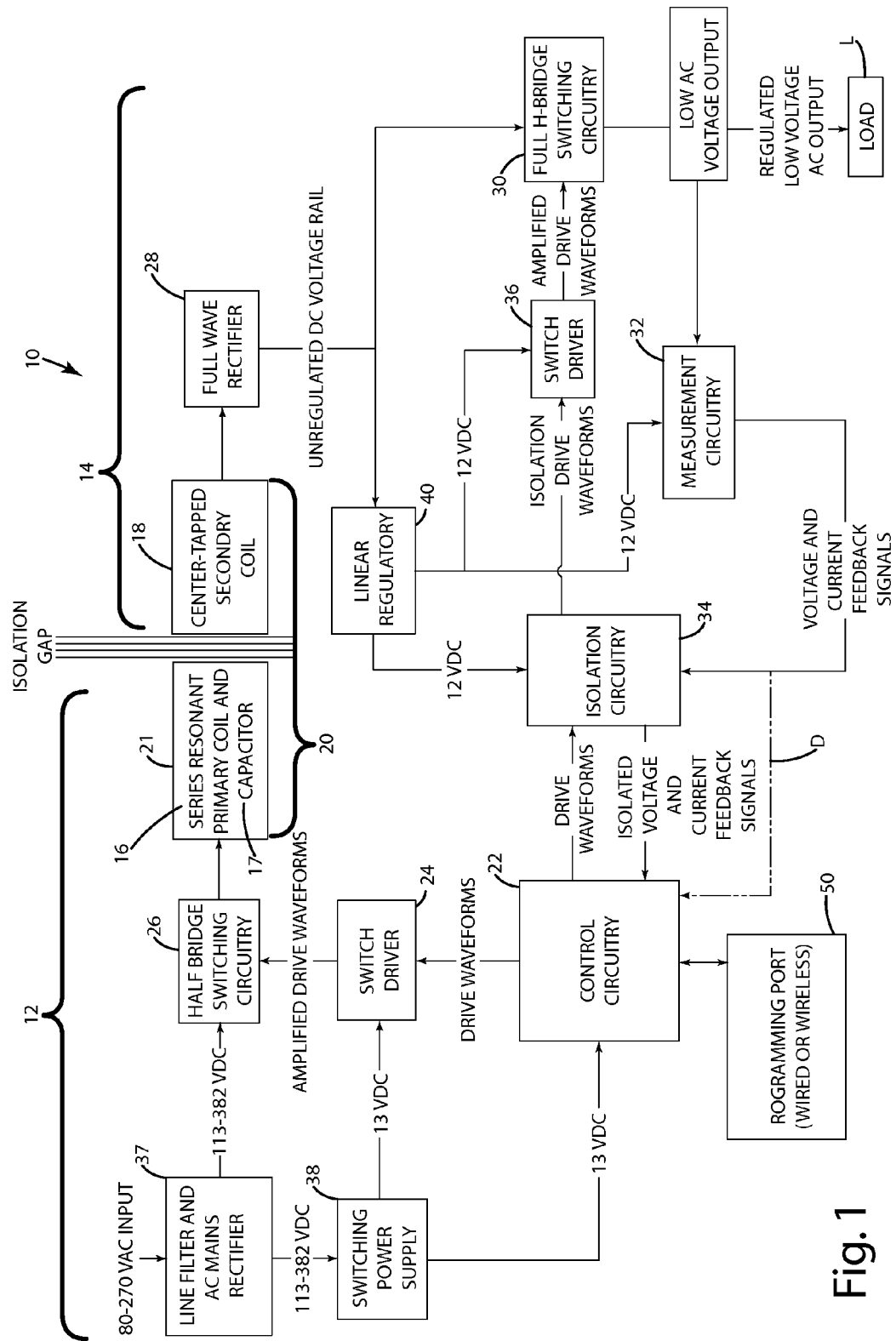
FIG. 1 is a block diagram of a power supply in accordance with an embodiment of the present invention.

Referring now to FIG. 1, a diagram of a power supply 10 having an air core transformer 20 in accordance with an embodiment of the present invention is shown. The power supply 10 generally includes a primary-side circuit 12 and a secondary-side circuit 14. As perhaps best shown in FIG. 2, the primary-side circuit 12 includes a primary coil 16 and the secondary-side circuit 14 includes a secondary coil 18. The primary coil 16 and secondary coil 18 cooperate to form a transformer 20. The transformer 20 may be coreless. The primary-side circuit 12 also generally includes a controller 22, a switch driver 24 and switching circuitry 26. The control circuitry 22 controls operation of the switch driver 24, which in turn controls the application of power to the primary coil 16. The secondary-side circuit 14 generally includes a rectifier 28, switching circuitry 30, measurement circuitry 32, isolation circuitry 34 and a switch driver 36. The output of the secondary-side circuit 14 may be applied to a load L. The output of the secondary-side circuit 14 is controlled by the control circuitry 22. The measurement circuitry 32 provides information regarding the output to the secondary-side circuit 14 to the control circuitry 22 through the isolation circuitry 34. The control circuitry 22 analyzes the information provided by the measurement circuitry 32 and controls operation of the switch driver 36 through the isolation circuitry 34.

The embodiment of FIG. 1 will now be described in more detail in connection with an operational overview of the power supply 10. Line mains voltage, in a common range, such as 80-270 VAC, is supplied to the line filter and AC mains rectifier 37. For purposes of disclosure, the present invention is described in connection with a power supply operating on line mains voltage of 80-270 VAC. The present invention may be readily adapted to provide AC or DC power from a wide variety of alternative AC and DC power sources. The line filter removes any unwanted electrical noise that may be present on the mains voltage, and helps prevent electrical noise from being radiated from the transformer, and the rectifier converts the VAC to VDC. A wide variety of filtering and rectifying circuits are known to those skilled in the art, and therefore the specific line filter/AC mains rectifier circuitry will not be described in detail. Suffice it to say that the line filter/AC mains rectifier 37 of the illustrated embodiment may be essentially any line filtering and rectifying circuitry capable of providing the desired filtering and rectifying of the incoming line mains power.

In the illustrated embodiment, DC voltage leaves the line filter/AC mains rectifier 37 at approximately 113-382 VDC for two components—the switching power supply 38 and the half bridge switching circuitry 26. The switching power supply 38 receives the 113-382 VDC and processes it to a desired level, for example, 13 VDC. A wide variety of switching power supplies are known to those skilled in the art, and therefore the switching power supply of the illustrated embodiment will not be described in detail. The switching power supply 38 may be essentially any switching power supply or other circuit components capable of producing DC power for the switch driver 24 and the control circuitry 22 from the output of the line filter/AC mains rectifier 37.

The control circuitry 22 is powered by the VDC generated from the switching power supply 38 and produces drive waveforms, which are sent to the switch driver 24 and to the isolation circuitry 34. In one embodiment, the control circuitry 22 includes a microcontroller 35 (See FIG. 8) capable of generating the primary-side and secondary-side drive waveforms. In the illustrated embodiment, the microcontroller 35 is programmed to carry out various features and functions as described herein. If desired, specific features and functions of the microcontroller 35 may be alternatively implemented in analog circuit components. The switch driver 24 then amplifies the drive waveforms sent from the control circuitry 22 and sends these newly amplified waveforms to the half-bridge switching circuitry 26. In the illustrated embodiment, the switch driver 24 may be a microprocessor specifically designed to function as a driver. The switch driver 24 may alternatively be essentially any circuitry capable of sufficiently amplifying the drive waveforms and applying them to the primary-side switching circuitry 26.

The primary-side switching circuitry 26 may include half-bridge switching circuitry having a first FET with its drain connected to the high voltage rail and its source connected to the tank circuit 21, and a second FET with its drain connected to the tank circuit 21 and its source connected to ground. The switch driver 24 is connected to the gates of the two FETs to selectively connect the tank circuit to the high voltage rail and ground in accordance with the drive waveforms.

The tank circuit 21 of the illustrated embodiment is a series resonant tank circuit that generally includes the primary coil 16 and a capacitor 17. The primary coil 16 and the capacitor 17 may be selected so that the tank circuit 21 is substantially at resonance when operating within an anticipated range of frequencies. If desired, the capacitor 17 may be a variable capacitor and/or the primary coil 16 may be a variable inductor to provide the tank circuit 21 with an adjustable resonant frequency. Although described in connection with a series resonant tank circuit, the power supply 10 may include alternative tank circuits, such as a parallel resonant tank circuit.

In operation, the switch driver 24 alternately closes and opens the first and second FETs of the half-bridge switching circuitry 26 to alternately connect the series resonant primary coil 16 and capacitor (the "primary" half of the inductively coupled coil) between the high voltage DC (113-382 VDC) rail and the ground. The resulting alternating current (AC) flows into the primary portion of the inductive coil. Using the circuitry component of the half-bridge 26, the drive waveforms sent to the primary coil 16 can be adjusted using frequency or duty cycle modulation.

The second half of the inductive coil, in this embodiment a secondary center-tapped coil 18, is placed within the magnetic field created by the primary coil 16. Once the secondary coil 18 is within range (but not in direct electrical contact), the inductive coupling is achieved and power is transferred from the primary coil 16 to the secondary coil 18, no core or direct electrical connection between the coils exists therefore electrical isolation from the mains provided.

The AC current received from the primary coil 16 is passed from the secondary coil 18 to a full wave rectifier 28. While a half-wave rectifier could be used, a full wave rectifier is more efficient in that both components of the AC waveform are converted to DC. However, the converted DC voltage is not constant and requires further treatment in order to be a constant DC voltage. Using a linear regulator 40, the converted DC voltage leaving the rectifier 28 is stabilized to a constant 12 VDC. Linear regulators are well known to those skilled in the art and therefore will not be described in detail. Suffice it to say that the linear regulator 40 may be selected from essentially any linear regulator circuitry or other circuitry capable of providing the desired level of regulation.

This constant 12 VDC from the linear regulator 40 is used to power the isolation circuitry 34, the measurement circuitry 32, and the switch driver 36 on the secondary side of the transformer. The control circuitry 22, which is powered by 13 VDC from the switching power supply 38 and provides drive waveforms to the switch driver 24, also provides drive waveforms to the isolation circuitry 34. The isolation circuitry 34 then passes these isolated drive waveforms to the switch driver 36, where they are amplified. The isolation circuitry 34 may be essentially any circuitry or circuit component(s) capable of passing signals from the secondary-side circuitry 14 to the primary-side circuitry 12 without a direct electrical connection. In the illustrated embodiment, the isolation circuitry 34 includes two optocouplers (or optoisolators), one passing signals from the measurement circuitry 32 to the control circuitry 22 and one passing drive waveforms from the control circuitry 22 to the secondary-side switch driver 36.

The now-amplified drive waveforms cause the switch driver 36 to alternately connect a full H-bridge switching circuit 30 that modulates the unregulated (not constant) DC voltage supplied from the full wave rectifier 28 back to a low voltage AC regulated waveform. The measurement circuitry 32 monitors and reports the low voltage AC output from the full H-bridge switching circuitry 30. The measurement circuitry 32 may include a voltage sensor (not shown) and a current sensor (not shown). The output of the voltage sensor of the measurement circuitry 32 is processed by the control circuitry 22 and used to determine the drive waveforms to be sent to the full H-bridge switching circuit 30. In the illustrated embodiment, the control circuitry 22 is programmed to attempt to maintain the output of the power supply 10 at a fixed voltage. This voltage is stored in memory as the voltage set point. If the voltage measured by the measurement circuitry 32 is higher than the voltage set point, the control circuitry 22 will reduce the duty cycle of the drive waveforms applied to the secondary-side switch driver 36. The reduction in duty cycle will in turn reduce the output voltage. Similarly, if the voltage measured by the measurement circuitry 32 is below the voltage set point, the control circuitry 22 will increase the duty cycle of the drive waveforms applied to the secondary-side switch driver 36. The output of the current sensor of the measurement circuitry 32 is processed by the control circuitry 22 to determine whether the secondary-side output is in an overcurrent or undercurrent state. If so, the control circuitry 22 may take appropriate action, such as to shut-off or reset the power supply. The control circuitry 22 may also or alternatively activate an overcurrent or undercurrent signal, such as a warning light (LED) or audible warning signal.

The control circuitry 22 may be programmed to provide additional functionality, as desired. For example, the control circuitry 22 may be programmed to selectively scale-up or scale-down the voltage or power of the output of the power supply 10. To achieve this functionality, the control circuitry 22 may adjust the drive waveforms applied to one or both of the primary-side and secondary-side switching circuitry, such as by varying the frequency and/or duty cycle of either or both drive waveforms. In the context of landscape lighting applications, this functionality permits landscape lamps to be selectively dimmed. This functionality may permit alternative control operations in other applications. For example, this functionality may be used to control motor speed in application in which the load includes a motor. Further, this functionality may permit the power supply to have a "soft start" in which the power to the load L is slowly ramped up.

Figure 2:
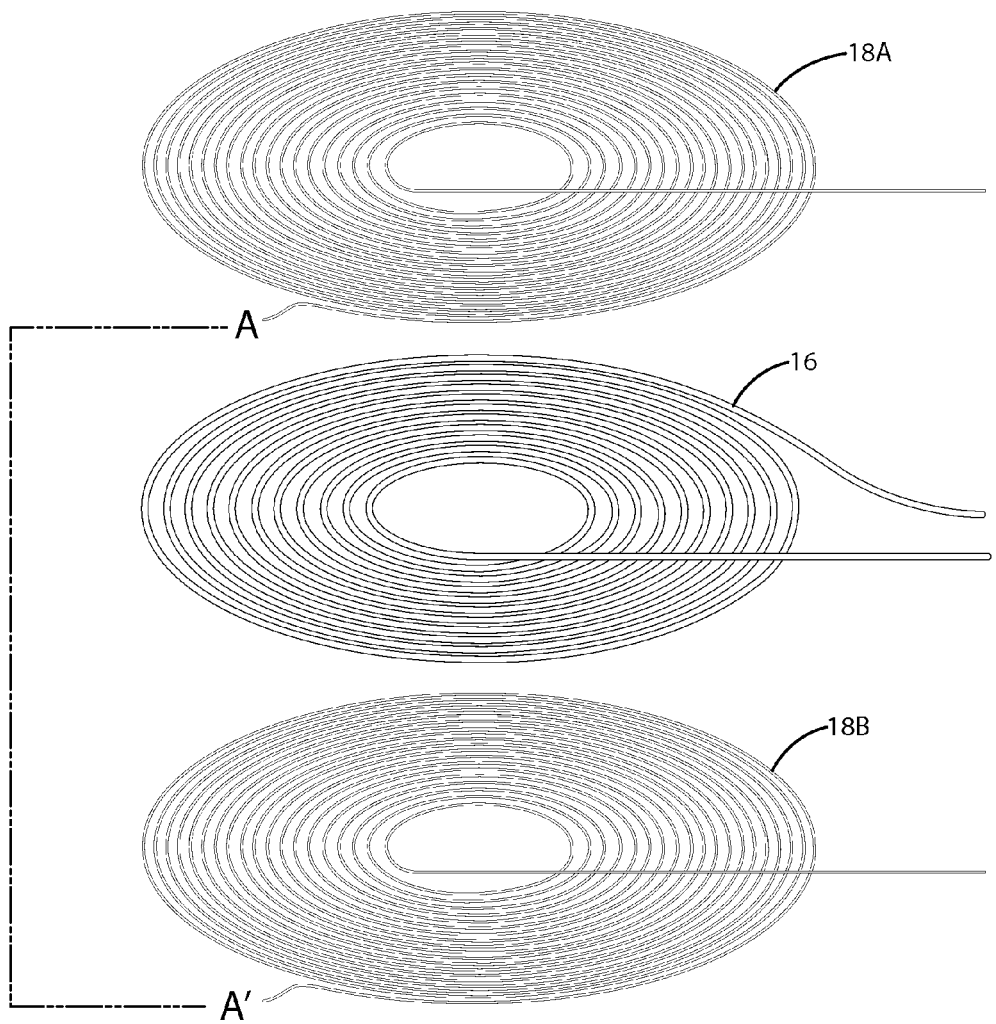
FIG. 2 is an exploded perspective view of an air core transformer.
Figure 3:
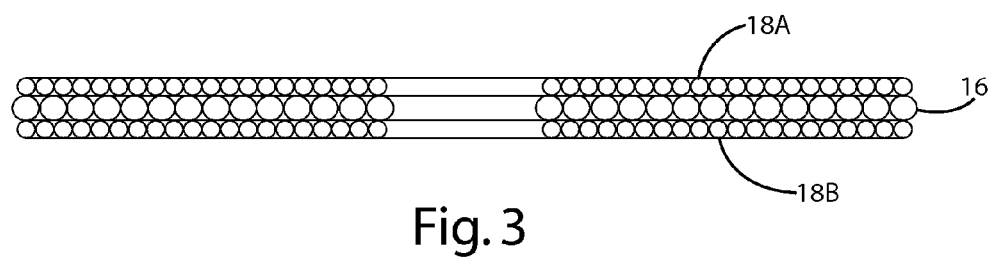
FIG. 3 is a cross-sectional view of the air core transformer.

The design and configuration of the transformer 20 may vary from application to application. However, in the illustrated embodiment, the transformer 20 is an air core transformer having a primary coil 16 that sandwiched between a split secondary coil 18. FIG. 2 is an exploded view of the transformer 20 of this embodiment showing the secondary coil 18 with first coil section 18a and second coil section 18b disposed on opposite sides of the primary coil 16. The first coil section 18a may be electrically connected to second coil section 18b as represented by the broken line connecting point A to point A'. Referring now to FIG. 3, a cross-section of the inductive coils of one embodiment is shown. As can be seen, the illustrated inductive coils are constructed in layers, and are largely coextensive with one another having similar inner and outer diameters. The primary coil 16 is spiral wound of, in this embodiment, 260×38 Litz wire, and sandwiched between split secondary spiral coil sections 18a and 18b made of #20 AWG magnet wire, in this embodiment. Although the illustrated embodiment includes a primary coil 16 sandwiched between the split secondary coil sections 18a and 8b, the primary coil 16 may alternatively be split. For example, the secondary coil 18 may include a single coil that is sandwiched between split coil sections of a primary coil. However, it is not necessary for either the primary coil 16 or the secondary coil 18 to be split.

The primary and secondary coils 16 and 18, respectively, may be arranged adjacent to each other, or they may be interwoven but separated by small gaps and held in an epoxy-based adhesive, or printed into a circuit board. While the spaces or air gaps between the coils may be very small, there is still sufficient space to allow isolation protection as disclosed herein, as opposed to a traditional iron or metal core transformer. If desired, the coils may be disposed directly against one another relying on the insulation to provide the gap necessary for the desired electrical isolation.

FIG. 8 is a circuit diagram of a power supply in accordance with an embodiment of the present invention. Various subcircuits are grouped together in and labeled with reference numerals corresponding to the description of the embodiment of FIG. 1. As shown, the circuit diagram includes line filter/AC mains rectifier 37, switch driver 24, primary-side switching circuitry 26, tank circuit 21 with primary coil 16 and parallel capacitors 17, secondary coil 16, rectifier 28, switching circuitry 30, measurement circuitry 32, isolation circuitry 34a and 34b, measurement secondary-side switch driver 36 and linear regulator 40. The embodiment of FIG. 8 differs, however, in that the measurement circuitry 32 is not connected to the control circuitry 22 via the isolation circuitry 32. Rather, the measurement circuitry 32 is directly connected to the control circuitry 22. This alternative is represented in FIG. 1 by a phantom line D. The measurement circuitry 32 could be isolated from the control circuitry 22 by adding an isolator, such as an optocoupler or optoisolator, between the measurement circuitry 32 and the control circuitry 22. Further, elements 34a and 34b of FIG. 8 may function as level shifters.

Figure 4:
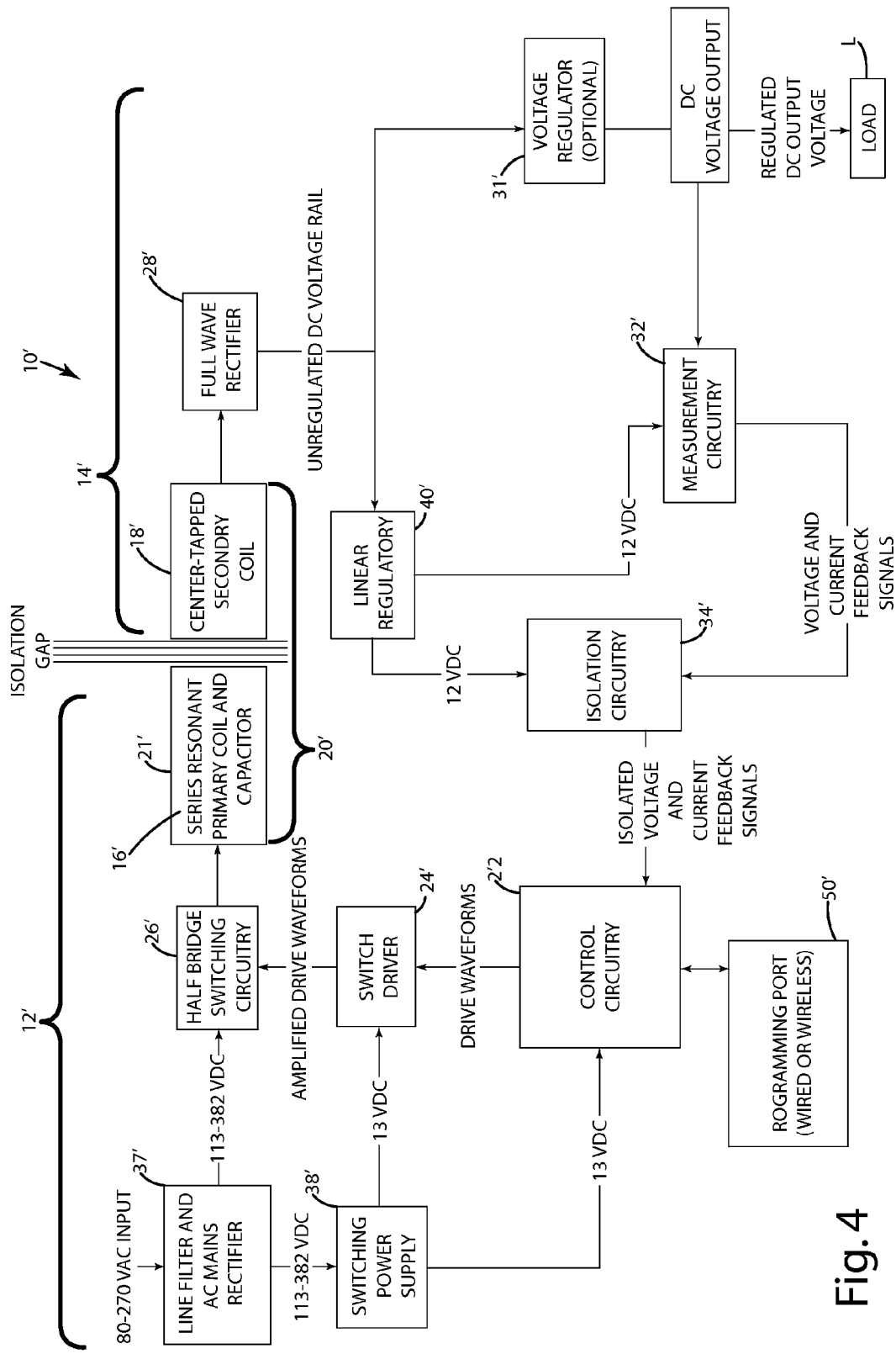
FIG. 4 is a block diagram of an alternative power supply adapted to provide DC power output.

Referring now to FIG. 4, a diagram of an alternative embodiment of the air core transformer is shown. In this embodiment, AC mains voltage is transformed to regulated DC voltage by the power supply 10'. DC voltage as an output is desirable for certain applications, such as use with solar cells and their storage batteries, batteries of any kind, automotive applications, telephone and other communication means, fuel cells, and transportation systems such as subway or other electromotive transportation systems. Many of the components of this embodiment are similar to those of the embodiment of FIG. 1. Accordingly, like components will be identified with like reference numerals and only those components that are not similar will be described in detail.

For solar cell applications, the transformer can be integrated into a system which supplements the solar cell storage batteries. Batteries used in solar systems are generally DC, but if an AC storage system is used, the AC resonant air core transformer as disclosed herein may be substituted. Power demands vary over periods of time, which mean that the cost of electric power also varies. As such, the resonant air core transformer can be used to replenish the solar system batteries at off-peak and/or off-demand periods, such as the early morning hours. Other replenish periods could be determined based upon cost, or electrical grid capacity. As such, the resonant air core transformer in DC or AC form could augment a solar cell system.

For transportation systems, many of which operate on DC power, but some AC as well, the resonant air core transformer is also well-suited to provide electrical power to the motive portions and onboard storage batteries and systems of these transportation systems. Scaling up an air core transformer, and including a plurality strategically placed about a subway or light rail system, for example, power can be provided to the transport vehicles electric motors, lights, climate control and other systems with the attributes as disclosed above. As such, the compactness of the resonant air core transformer, for example, is one such advantage that allows for a smaller transportation support footprint. In urban areas, space is at a premium, and setting aside large spaces for transformers (and their required safety zone) is avoided with the resonant air core transformer.

The embodiment of FIG. 4 will now be described in connection with an operational overview of the power supply 10'. Line mains voltage, in a common range, such as 80-270 VAC, is supplied to the line filter and AC mains rectifier 37'. The line filter removes and unwanted electrical noise that may be present on the mains voltage, and helps prevent electrical noise from being radiated from the transformer, and the rectifier converts the VAC to VDC.

DC voltage leaves the line filter/AC mains rectifier 37' at approximately 113-382 VDC for two components—the switching power supply 38' and the half bridge switching circuitry 26'. The switching power supply 38' receives the 113-382 VDC and processes it to a desired level, for example, 13 VDC.

The control circuitry 22' is powered by the VDC generated from the switching power supply 38' and produces drive waveforms, which are sent to the switch driver 24'. The switch driver 24' then amplifies the drive waveforms using power from the switching power supply 38' and sends these newly amplified waveforms to the half-bridge switching circuitry 26'.

The switching circuitry of the half-bridge alternately connect the tank circuit 21' (e.g. series resonant primary coil and capacitor) between the high voltage DC (113-382 VDC) rail and the ground. The resulting alternating current (AC) flows into the primary portion of the inductive coil. Using the circuitry component of the half-bridge, the drive waveforms sent to the primary coil 16' can be adjusted using frequency or duty cycle modulation.

The second half of the inductive coil, in this embodiment a secondary center-tapped coil 18', is placed within the magnetic field created by the primary coil 16'. Once the secondary coil 18' is within range (but not in direct contact), the inductive coupling is achieved and power is transferred from the primary coil 16' to the secondary coil 18', leaving an "air core" in between in the illustrated embodiment.

The AC current received from the primary coil 16' is passed from the secondary coil 18' to a full wave rectifier 28'. While a half-wave rectifier could be used, a full wave rectifier is more efficient in that both components of the AC waveform are converted to DC. However, the converted DC voltage is not constant and may benefit from further treatment in order to be a constant DC voltage. The secondary-side circuitry 14' may include a linear regulator 40' to stabilize the converted DC voltage and provide a constant 12 VDC. This constant 12 VDC from the linear regulator 40' is used to power the isolation circuitry 34' and the measurement circuitry 32' on the secondary side of the transformer 20'.

The unregulated DC voltage may be connected to an optional voltage regulator 31', which regulates the input DC voltage to a desired DC output voltage. A variety of voltage regulators are well known to those skilled in the field. The voltage regulator 31' may be essentially any voltage regulator suitable for operation with the expected input and output power characteristics. If desired, the secondary-side circuitry 14' may include additional filtering and conditioning circuitry (not shown) to produce power for the load L. For example, conventional filtering and conditioning circuitry may be included between the rectifier 28' and the secondary-side output. In some applications, the DC power produced by the rectifier 28' is adequate to power the load L without further conditioning, filtering or other treatment. In such applications, the optional voltage regulator 31' may be eliminated.

The measurement circuitry 32' analyzes the DC output voltage and provides that data to the isolation circuitry 34' as voltage and current feedback signals. These signals are passed to the control circuitry 22' through the isolation circuitry 34' for analysis and as a continuous (or, alternatively, periodic) control on the current supplied on the primary coil side. In one embodiment, the control circuitry 22' monitors for overcurrent and undercurrent conditions. In this embodiment, the measurement circuitry 32' may include current sensor circuitry that measures or otherwise determines the current of the secondary-side output. If an overcurrent or undercurrent condition arises, the control circuitry 22' may take appropriate action as described above in connection with the embodiment of FIG. 1. In another embodiment, the control circuitry 22' may alternatively or in addition monitor the voltage of the secondary-side output. If the voltage is too high or too low, the control circuitry 22' may take remedial action. For example, if the voltage is too low, the control circuitry 22' may vary the drive waveforms applied to the primary coil 16. This may include varying the duty cycle or frequency of the drive waveforms. More specifically, if the measured voltage is too low, the control circuitry 22' may increase the duty cycle and/or the frequency of the drive waveforms applied to the primary coil 16 and, if the measured voltage is too high, the control circuitry 22' may decrease the duty cycle and/or the frequency of the drive waveforms applied to the primary coil 16.

The power supply 10 and 10' may include a simple integrated user interface that permits a user to program the power supply 10 and 10' without the assistance of any additional components. Although the user interface may vary from application to application, in one embodiment, the user interface includes a push button and a light emitting diode (LED). The push button and LED are used to set a variety of operational parameters. Using the landscaping lighting example as before, when the user has connected a number of lights to the air core transformer via its power supply cable, and has connected the transformer to mains power, the user interface may be used as follows.

The power supply is optionally equipped with a photocell or other light-measurement device, which is used (in this example) to control when the lights should be powered on and off, to conserve electricity. The user energizes the power supply, either by engaging the push button or by connecting the power supply to mains power. The photocell or similar devices begins measuring ambient light levels, and turns off the lights (ceases supplying power) if the calibrated photocell reaches a sufficient level of ambient light.

If the user desires to setup the power supply and its connected lights, the user engages the push button on the power supply, which results in the power supply entering a configuration mode. In this example, four settings are possible—high (light brightness), medium, low and off. Each depression of the push button will cause the power supply to operate at the next setting. A fifth depression of the push button will result in the return to the first, thereby creating a loop. Thus, if the button is pushed three times, the current setting will be low (light brightness). If the setting is made during daylight, the selected setting (if one of lamps being on at some intensity), the lamps will remain lit for that daylight period, through the following night, and the lamps will be extinguished at sufficient ambient light the next day.

In order to permanently set the power supply in the illustrated embodiment, a setup mode is entered by pushing the button and holding for five or more seconds, in this example. The LED will blink slowly at 50% duty cycle to indicate that the setup mode has been entered. Once the LED has begun blinking, the user releases the button. At this point, the button operates as above, only in this setup mode, the selection is stored in the power supply's electrically erasable programmable read-only memory (EEPROM). If the user does not select an operating mode within 5 seconds, the power supply will default to a predetermined mode (such as high). If the user has selected an operating mode within the 5-second window, however, that mode is stored in memory and will be followed for every subsequent activation of the power supply (every night).

In the event that the power supply detects an excessive amount of current (short circuit) passing through the power supply line while in automatic (programmed) mode, the power supply will automatically deactivate the lamps and indicate an error using the LED. This indication is made using a series of LED blinks, in this example, such as frequent flashing followed by a pause and another group of frequent LED flashes.

In the event the power supply detects an open circuit (undercurrent condition), again the power supply will deactivate and display, using the LED, that such a condition exists. In the case of an undercurrent condition, a single LED flash followed by a long pause, repeating, could be displayed, for example.

In normal operation, the LED remains lit to indicate to the user that the power supply is operating as programmed and there are no operational faults present.

Computer software with a graphical user interface (See FIGS. 5 and 6) may additionally or alternatively be used to program the power supply 10 or 10' or to perform diagnostics. The power supply 10 or 10' may include a wired or wireless programming port 50 or 50'. The power supply is optionally equipped with a communications link 50, either wired or wireless, that enables communication, such as with a laptop computer or other similar device. This software allows high-level maintenance, repair, or installation of the air core transformer, and provides much more detailed information and parameters pertaining to the transformer's performance and operating condition.

Figure 5:
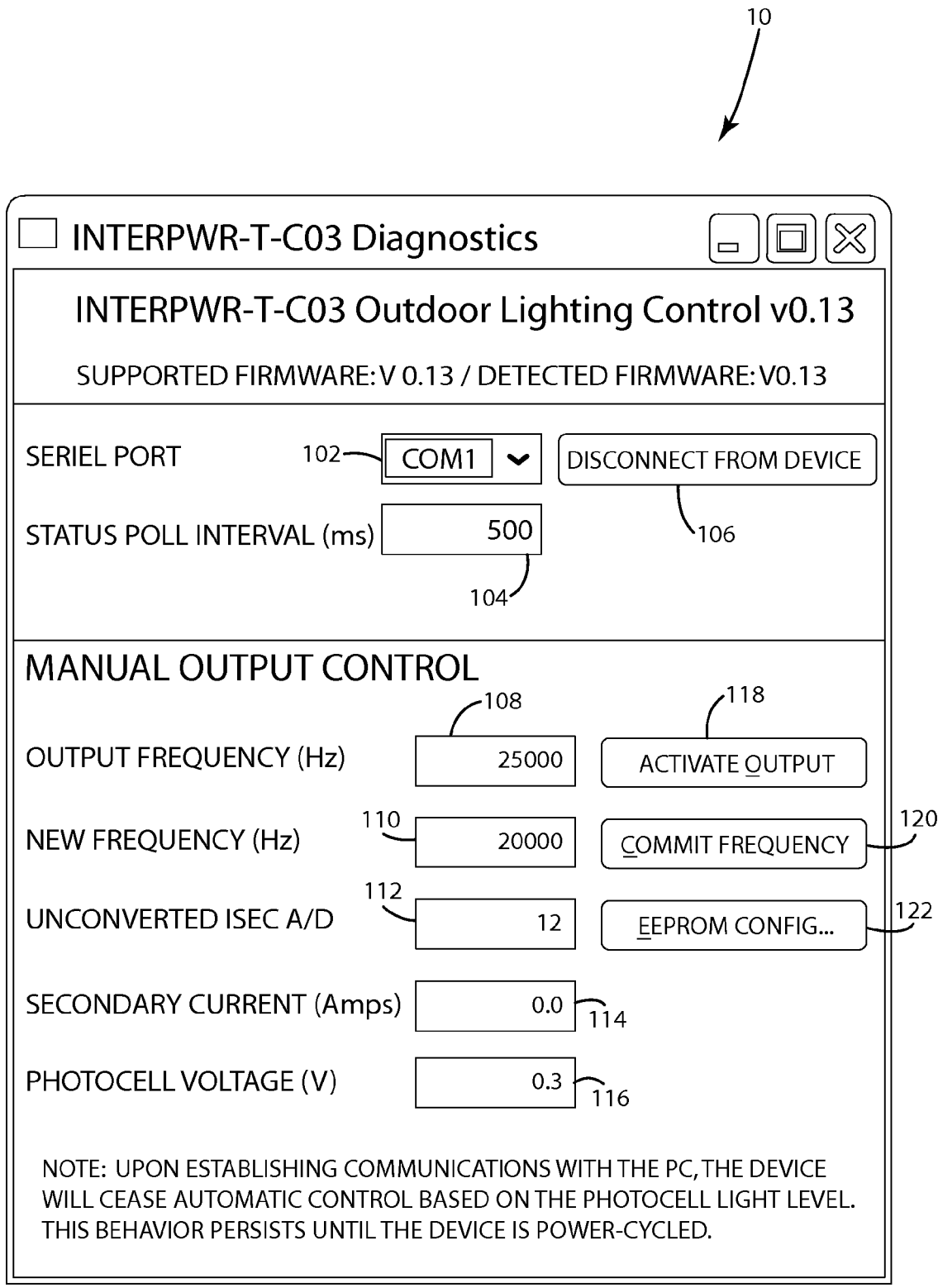
FIG. 5 is a representation of the main dialog screen for the power supply software.

On the laptop computer, once a connection has been established, a main display window of the computer software appears. The main display window 100 of one embodiment of the computer software is shown in FIG. 5. A user may obtain information about the power supply and control its operating parameters by interacting with the main display window as summarized below:

Serial Port 102—Allows the user to select the port for communication—in this case, using a serial computer port.

Status Poll Interval 104—a display of the interval in milliseconds between polls of the transformer for status information. The smaller the number, the faster the display window will update.

Connect to Device/Disconnect from Device button 106—this button allows the user to connect or disconnect from the transformer by toggling a display window button.

Output Frequency 108—shows the present output frequency of the transformer.

New Frequency 110—editable field that allows the user to manually enter a new frequency for the transformer.

Unconverted ISEC A/D 112—field that shows the raw A/D return for the secondary coil current sense peak detector, useful for calibration purposes.

Secondary Current 114—field that shows the result of converting the raw A/D value into Amps.

Photocell Voltage 116—gives an indication of the ambient light level as detected by the CdS cell. Usually low voltages indicate more light and high voltages indicate low light.

Activate/Deactivate Output button 118—allows the user to toggle the output status of the transformer.

Commit Frequency button 120—sends the value of the New Frequency field to the transformer and assigns it as the active frequency. The Output Frequency field then updates to display the new value.

EEPROM Configure button 122—launches the EEPROM configuration dialog.

Figure 6:
FIG. 6 is a representation of the EEPOM configuration dialog screen for the power supply software.
Figure 7:
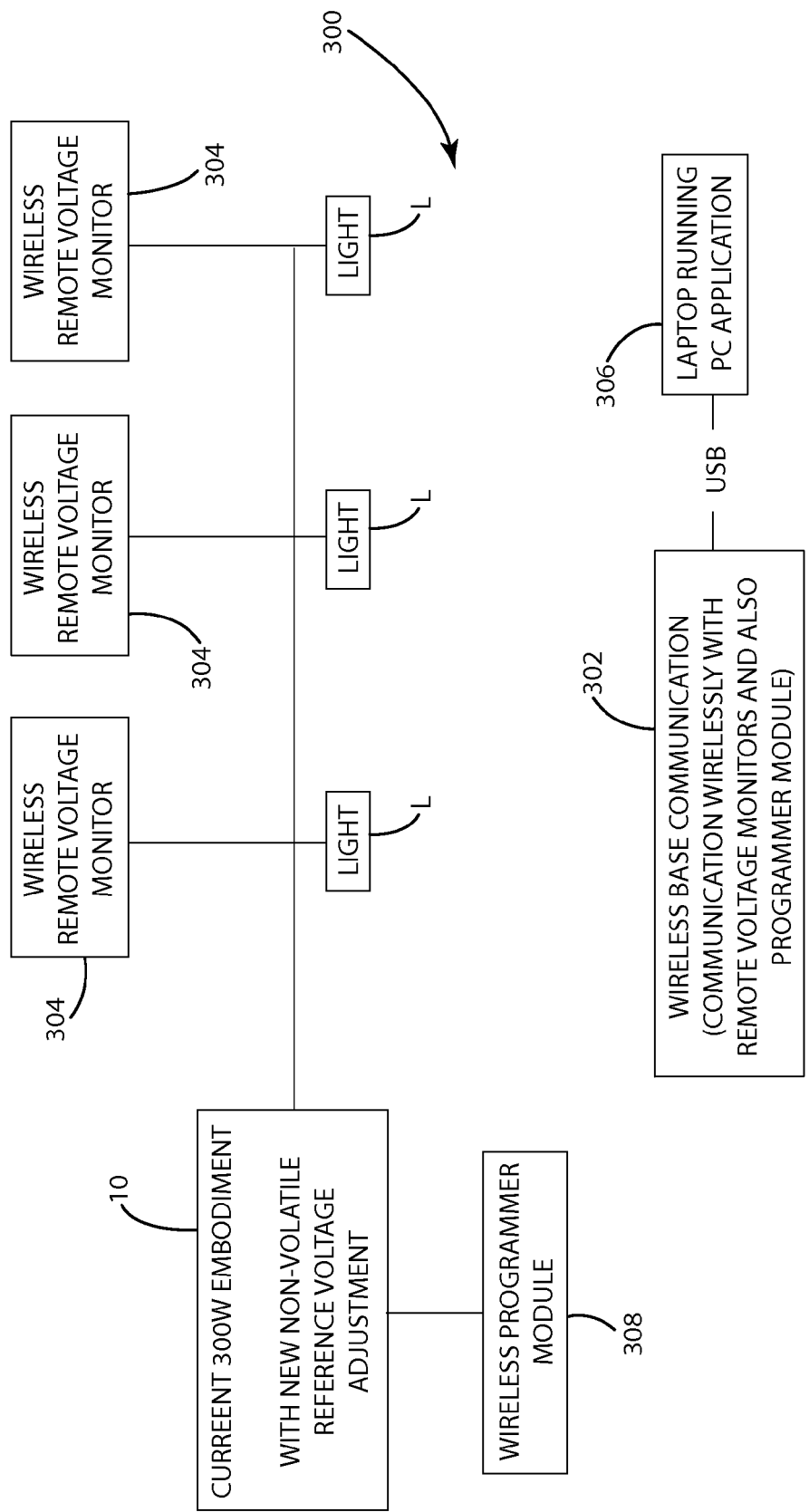
FIG. 7 is a block diagram of an alternative embodiment having remote voltage monitors.
Figure 8A:
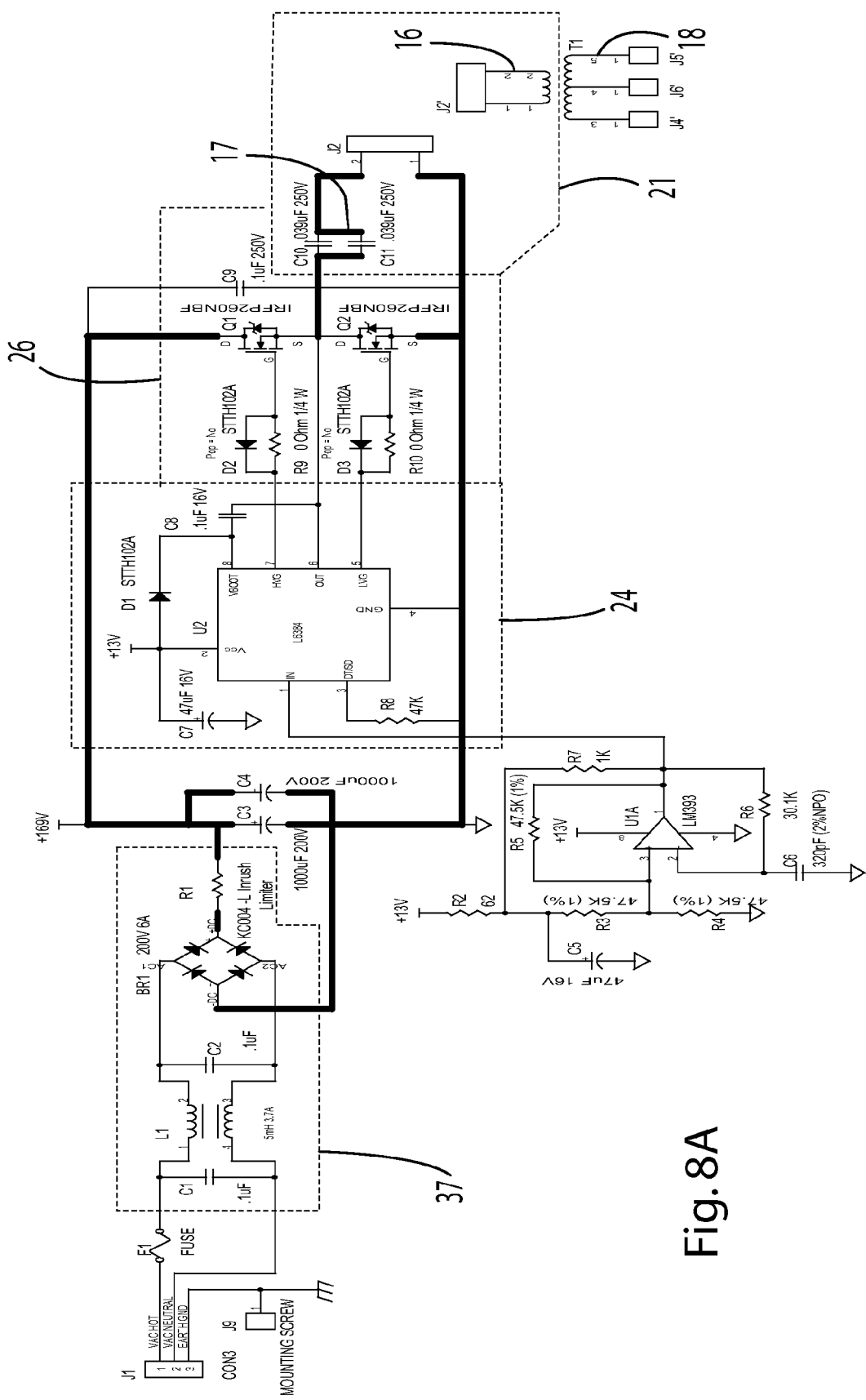
FIG. 8 is a circuit diagram of a power supply in accordance with an embodiment of the present invention.
Figure 8B:
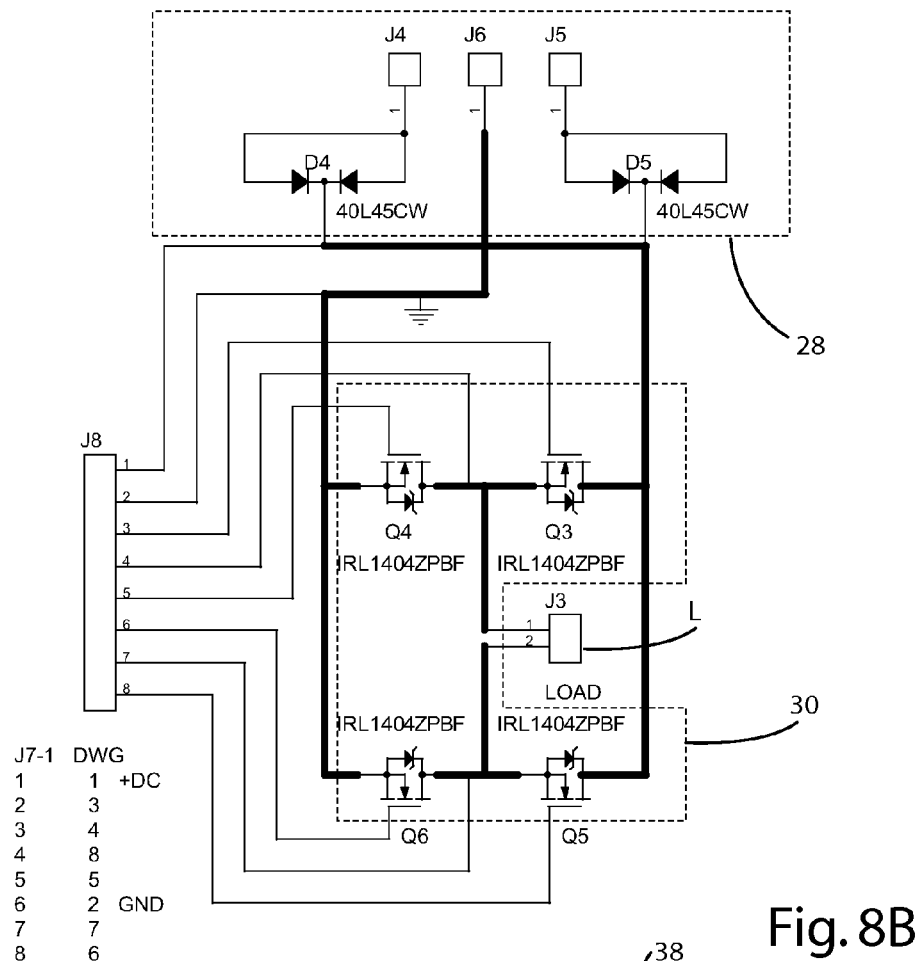
Figure 8B:
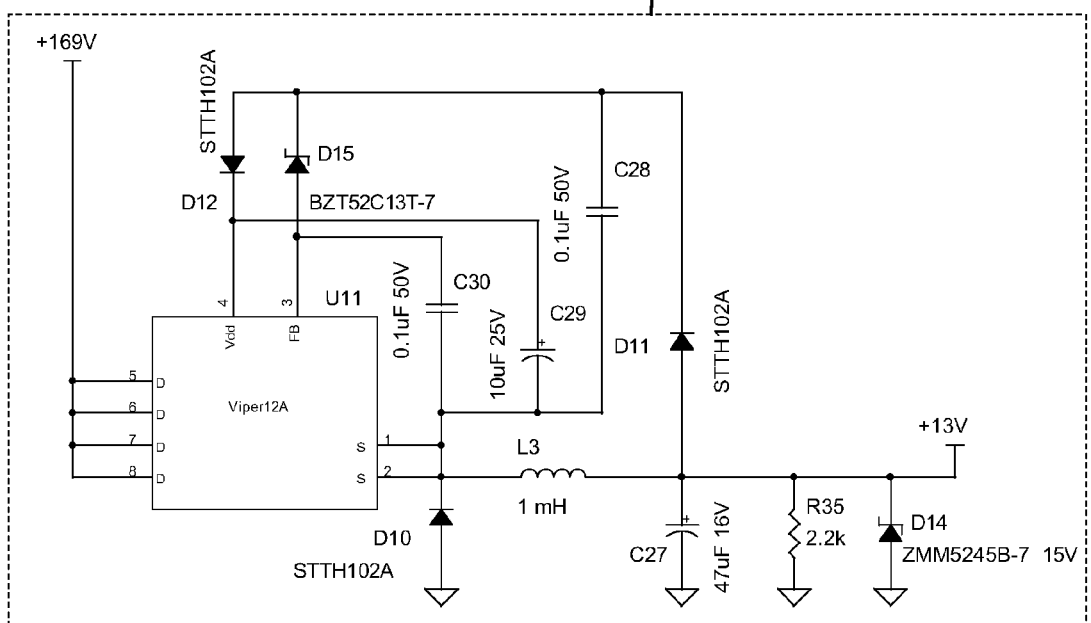
Figure 8C:
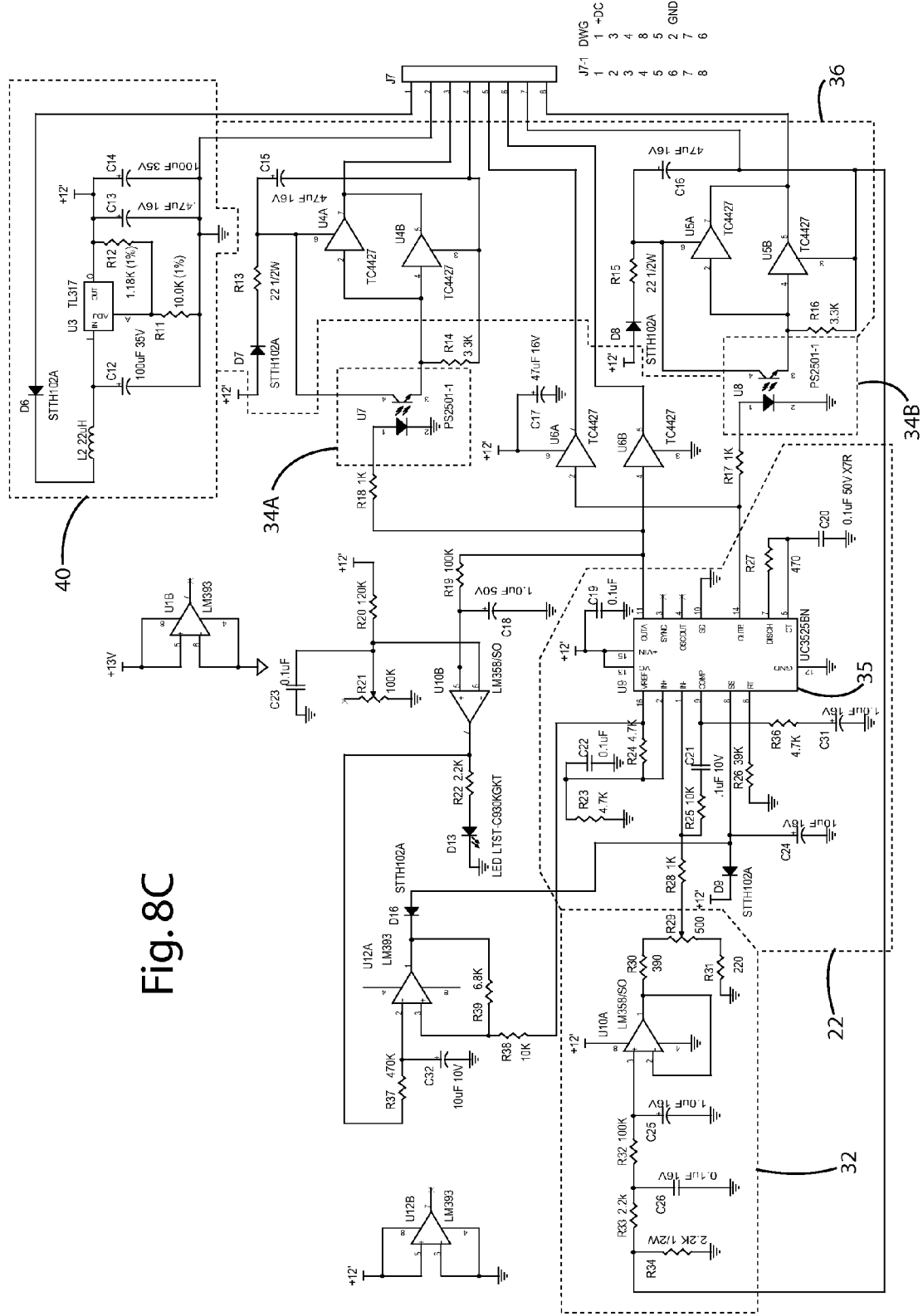

Referring now to FIG. 6, the EEPROM configuration dialog 200 allows the user to set various parameters that govern the operation of the transformer. Some of the parameters are listed below:

Current Conversion Factor 202—a value used in the conversion between raw A/D values and the estimated secondary current in Amps.

Current Offset 204—a value used in the conversion between raw A/D values and the estimated secondary current in Amps.

Maximum Secondary Current 206—the maximum current in Amps that the transformer will provide to the secondary coil before deactivating and indicating a short circuit condition.

Minimum Secondary Current 208—the minimum current in Amps that the transformer will provide before deactivating and indicating an open circuit condition.

Photocell Voltage for Auto-Activate 210—if the photocell voltage remains above this value for the Minimum Photocell Level Sustain Time, the transformer will activate and power the lamps.

Photocell Voltage for Auto-Shutoff 212—the inverse of the above. By separating the On and Off light voltage levels into two values, a useful hysteresis can be developed with respect to the light levels, providing the desired light operation.

Min. Photocell Level Sustain Time 214—the amount of time that the photocell voltage must be above the auto activation threshold or below the auto shutoff threshold before the transformer changes operational state. This allows for momentary changes in ambient light without interfering with the standard operation of the transformer. For example, if light from a passing car causes a momentary increase in ambient light, the transformer will continue to power the lights.

Frequency Upper Bound 216—the maximum frequency at which the transformer will power the lights, even under manual control (using the push button). Set at safe operational levels.

Frequency Lower Bound 218—same as above, but for the lower bound.

Frequency for HIGH setting 220—the frequency at which the transformer is programmed to the HIGH level output.

Frequency for MEDIUM setting 222—the frequency for medium transformer output.

Frequency for LOW setting 224—the frequency for low transformer output.

Active Setting 226—shows the current operational setting of the transformer.

In an alternative embodiment, the present invention may include a power supply tuning system 300 that is useful in adjusting the voltage set point or other operating characteristics of the power supply 10 or 10' to compensate for power loss along a power supply line being powered by the power supply 10 or 10'. The tuning system 300 generally includes a base 302, one or more remote voltage monitors 304 and a computer 306 or other similar device. In the illustrated embodiment, the base 302 is configured to receive voltage measurements from the remote voltage monitors 304. The remote voltage monitors 304 may be used to measure voltage at various locations along the power supply line and to communicate the measured line voltages to the base 302. The base 302 is connected to a computer 306, such as a laptop computer, for example, by a USB connection. The computer 306 runs software configured to interface with the base 302 and provide output indicative of the voltage measurements received from the remote voltage monitors 304. The software may show voltage or voltage loss at each of the remote voltage monitors 304. By reviewing the output of the software, the installer can determine voltage loss along the power supply line and vary the voltage set point to provide optimal voltage to the load(s). If desired, the software may be programmed to evaluate the voltage loss and provide an optimal voltage set point. The remote voltage monitors 304 may be used to measure power loss during installation or at other times. The remote voltage monitors 304 may be removable or they may be integrated into the loads.

In one embodiment, the base 302 is capable of programming the power supply 10 or 10', for example, to assign the voltage set point. In this embodiment, the system 300 includes a programmer module 308 that is configured to interface with the power supply control circuitry 22 or 22', and to communicate with the base 302. The programmer module 308 may include a transceiver that permits the programmer module 308 to communicate wirelessly with the base 302. In an alternative embodiment, the programmer module 308 may be coupled to the base 302 or the computer 306 by a wired connection. In either event, the software operating on the computer 306 may include functionality that permits the computer 306, either directly or through the base 302, to set the voltage set point of the power supply 10 or 10'. Although described in connection with adjustments to the voltage set point of the power supply, the system 300 may be used to vary other operating parameters of the power supply 10 or 10', if desired.

In the illustrated embodiment, the remote voltage monitors 304 each include a true RMS voltmeter to measure line voltage and are capable of reporting measured voltage back to the base 302 when polled. For example, the remote voltage monitors 304 and base 302 may each include an RF transceiver. In applications that include multiple remote voltage monitors 304, each voltage monitor 304 may be tagged with a unique address to avoid collisions on the RF link with the base 302. In the illustrated embodiment, each remote voltage monitor 304 has its address set by a series of dip switches on the circuit board. In operation, the base 302 may poll each remote voltage monitor 304 to determine the line voltage at the monitor 304. Although the remote voltage monitors 304 of the illustrated embodiment include a wireless communication system, they may alternatively utilize a wired connection.

In landscape lighting applications where a plurality of lamps are installed along a power supply line, one or more remote voltage monitors 304 may be used to measure voltage at each lamp L. In situations where a significant power loss is found along the power supply line, the voltage set point of the power supply can be increased as a function of the measured voltages to provide a voltage set point that yields the most appropriate balance between the plurality of lamps L.

If not otherwise stated herein, it is to be assumed that all patents, patent applications, patent publications, and other publications (including web-based publications) mentioned and cited herein are hereby fully incorporated by reference herein as if set forth in their entirety herein.

Although illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure as defined in the claims, which are to be interpreted in accordance with the principles of patent law including the doctrine of equivalents. Any reference to claim elements in the singular, for example, using the articles "a," "an," "the" or "said," is not to be construed as limiting the element to the singular.

What is claimed is:

1. A power supply comprising:
   primary-side circuitry having control circuitry and a primary, said control circuitry controlling operation of the power supply;
   secondary-side circuitry having a secondary and measurement circuitry, wherein said primary and said secondary are inductively coupled to provide isolation protection;
   isolation circuitry coupling the primary-side circuitry and the secondary-side circuitry, said isolation circuitry providing communication between said measurement circuitry and said control circuitry, said control circuitry configured to adjust operation of the power supply in response to communications from said measurement circuitry;
   wherein said secondary-side circuitry includes switching circuitry;
   wherein said measurement circuitry includes a voltage sensor, said measurement circuitry communicating a measured voltage to said control circuitry through said isolation circuitry, said control circuitry configured to vary a duty cycle of said drive waveform for said secondary-side switching circuitry as a function of said measured voltage; and
   wherein said secondary-side current includes a switch driver electrically connected to said secondary-side switching circuitry, said control circuitry coupled to said switch driver through said isolation circuitry, whereby said control circuitry applies said drive waveforms for said secondary-side switching circuitry to said secondary-side switch driver.

2. The power supply of claim 1 wherein said primary and said secondary are inductively coupled via at least one of an insulator or an air gap.

3. The power supply of claim 1 wherein said primary-side circuitry includes a series resonant tank circuit, said tank circuit including said primary and a capacitor.

4. The power supply of claim 1 wherein said secondary-side circuit includes a rectifier electrically connected to said secondary, said rectifier rectifying power inductively generated in said secondary.

5. The power supply of claim 1 wherein said control circuitry is configured to generate drive waveforms for said secondary-side switching circuitry as a function of said communications from said measurement circuitry.

6. The power supply of claim 1 wherein said measurement circuitry includes a current sensor, said measurement circuitry communicating a measured current to said control circuitry through said isolation circuitry, said control circuitry configured to take remedial action if said measured current represents an overcurrent or undercurrent condition.

7. The power supply of claim 1 wherein said secondary-side circuitry includes a linear regulator electrically connected to said secondary-side rectifier, said linear rectifier supplying power to at least one of said switch driver, said measurement circuitry and said isolation circuitry.

8. The power supply of claim 7 wherein at least one of said primary and said secondary is a split coil, said split coil including two coil sections sandwiching the other of said primary and said secondary.

9. A power supply comprising:
   primary-side circuitry having control circuitry and a primary, said control circuitry controlling operation of the power supply;
   secondary-side circuitry having a secondary and switching circuitry, said primary and said secondary being inductively coupled via an air core, wherein said primary and said secondary are inductively coupled to provide isolation protection; and
   isolation circuitry coupling the primary-side circuitry and the secondary-side circuitry, said isolation circuitry providing communication between said primary-side circuitry and said secondary-side circuitry, said control circuitry adapted to provide drive waveforms for said secondary-side switching circuitry through said isolation circuitry.

10. The power supply of claim 9 wherein said secondary-side circuit includes a rectifier electrically connected to said secondary, said rectifier rectifying power inductively generated in said secondary to produce a substantially DC output.

11. The power supply of claim 10 wherein said secondary-side switching circuitry is coupled to said rectifier, said secondary-side switching circuitry being operable to generate an AC output from said DC output.

12. The power supply of claim 11 wherein said secondary-side switching circuitry is a full H-bridge switching circuit.

13. The power supply of claim 12 wherein said secondary-side circuitry includes a switch driver coupled to said full H-bridge switching circuit.

14. The power supply of claim 13 wherein said secondary-side circuitry includes measurement circuitry having a voltage sensor, said measurement circuitry communicating a measured voltage to said control circuitry through said isolation circuitry, said control circuitry configured to vary a duty cycle of said drive waveform for said secondary-side switching circuitry as a function of said measured voltage.

15. The power supply of claim 14 wherein said measurement circuitry includes a current sensor, said measurement circuitry communicating a measured current to said control circuitry through said isolation circuitry, said control circuitry configured to take remedial action if said measured current represents an overcurrent or undercurrent condition.

16. The power supply of claim 15 wherein said control circuitry is coupled to said switch driver through said isolation circuitry, whereby said control circuitry applies said drive waveforms for said secondary-side switching circuitry to said secondary-side switch driver.

* * * * *